United States Patent
Wu et al.

(10) Patent No.: US 9,428,614 B2
(45) Date of Patent: Aug. 30, 2016

(54) POLYIMIDE FIBER WITH HIGH STRENGTH AND HIGH MODULUS AND ITS PREPARATION METHOD

(71) Applicant: BEIJING UNIVERSITY OF CHEMICAL TECHNOLOGY, Beijing (CN)

(72) Inventors: Dezhen Wu, Beijing (CN); Hongqing Niu, Beijing (CN); Shengli Qi, Beijing (CN); Enlin Han, Beijing (CN); Xiaona Yan, Beijing (CN); Guofeng Tian, Beijing (CN); Zhanpeng Wu, Beijing (CN); Xiaodong Wang, Beijing (CN)

(73) Assignee: BEIJING UNIVERSITY OF CHEMICAL TECHNOLOGY, Beijing (CN)

( * ) Notice: Subject to any disclaimer, the term of this patent is extended or adjusted under 35 U.S.C. 154(b) by 90 days.

(21) Appl. No.: 13/726,489

(22) Filed: Dec. 24, 2012

(65) Prior Publication Data

US 2013/0137846 A1      May 30, 2013

Related U.S. Application Data

(63) Continuation of application No. PCT/CN2011/080401, filed on Sep. 30, 2011.

(30) Foreign Application Priority Data

Aug. 4, 2011   (CN) .......................... 2011 1 0222300

(51) Int. Cl.
   *C08G 73/10*    (2006.01)
   *D01D 1/02*     (2006.01)
   (Continued)

(52) U.S. Cl.
   CPC ....... *C08G 73/1042* (2013.01); *C08G 73/1003* (2013.01); *C08G 73/1085* (2013.01);
   (Continued)

(58) Field of Classification Search
   CPC .......... C08G 73/1042; C08G 73/1085; C08G 73/1067
   See application file for complete search history.

(56) References Cited

U.S. PATENT DOCUMENTS

| 4,370,290 A | 1/1983 | Makino et al. ............... 264/184 |
| 5,378,420 A | 1/1995 | Harris et al. ................. 264/184 |

(Continued)

FOREIGN PATENT DOCUMENTS

| CN | ZL02112048.X | 6/2002 |
| CN | 101200822 A  | 6/2008 |

(Continued)

OTHER PUBLICATIONS http://www.merriam-webster.com/dictionary/step, accessed Feb. 18, 2015.*

(Continued)

*Primary Examiner* — Rachel Kahn
(74) *Attorney, Agent, or Firm* — J.C. Patents (57) ABSTRACT

A high-strength high-modulus polyimide fiber and its preparation method pertain to the technical field of high-performance organic fiber. This fiber includes the polyimide (PI) fiber made from 3,3',4,4'-biphenyl tetracarboxylic diandhydride (BPDA), p-phenylenediamine (pPDA) and 2-(4-aminophenyl)-1H-benzimidazol-5-amine (BIA), wherein the molar ratio between PPDA and BIA is 1:10~3:1. During the synthesis, other diamine and diandhydride monomers may also be added. In the preparation process, the gradient temperature reaction method and one-step continuous preparation method are adopted, the synthesis and processing difficulty caused by the increase of the content of BIA is overcome, the problem of poor uniformity and stability of fiber is solved and PI fiber with high strength and high modulus is obtained. Its strength may reach 4.5 GPa and modulus may reach 201 GPa. Moreover, the sources of the raw materials are extensive, the spinning process is continuous, the cost is low, the efficiency is high and industrial production may be realized.

5 Claims, 2 Drawing Sheets

(51) Int. Cl.
*D01D 5/06* (2006.01)
*D01D 5/12* (2006.01)
*D01D 10/02* (2006.01)
*D01F 6/78* (2006.01)
*C08G 73/18* (2006.01)
*C08L 79/04* (2006.01)
*C08L 79/08* (2006.01)

(52) U.S. Cl.
CPC .............. *C08G73/18* (2013.01); *C08L 79/04* (2013.01); *C08L 79/08* (2013.01); *D01D 1/02* (2013.01); *D01D 5/06* (2013.01); *D01D 5/12* (2013.01); *D01D 10/02* (2013.01); *D01F 6/78* (2013.01)

(56) References Cited

U.S. PATENT DOCUMENTS

2004/0249117 A1* 12/2004 Acar et al. .................... 528/353
2010/0029159 A1    2/2010 Ishihara et al. ............... 442/301

FOREIGN PATENT DOCUMENTS

| CN | 101611182 A | 12/2009 |
|---|---|---|
| CN | 101984157 A | 3/2011 |
| CN | 102041576 A | 5/2011 |
| CN | 102041577 A | 5/2011 |
| CN | 102191581 A * | 9/2011 |
| EP | 2 096 199 A1 | 9/2009 |
| JP | 3-287815 A | 12/1991 |
| JP | 4-18115 A | 1/1992 |
| JP | 2006-176907 | 7/2006 |
| KR | 2009-0089902 | 8/2009 |
| RU | 2009 127 106 A | 1/2011 |
| WO | WO2008/075751 | 6/2008 |
| WO | WO2011/018893 | 2/2011 |

OTHER PUBLICATIONS

Liu et al (Correlation between hydrogen-bonding interaction and mechanical properties of polyimide fibers, Polym. Adv. Technol. 2009, 20, 362-366).*
BASF Corporation (Paper Number: 2000-01-1319, Tensile Properties of Semi Crystalline Thermoplastics—Performance Comparison under Alternative Testing Standard, pp. 1-14, 2003).*
Davis (Tensile Testing—2nd Edition. Materials Park, OH, USA: A S M International, 2004. ProQuest ebrary. Web. Feb. 19, 2015. Copyright © 2004. Chapter 9, p. 158).*
International Search Report of international application No. PCT/CN2011/080401, dated Oct. 5, 2012.

* cited by examiner

Figure 3

POLYIMIDE FIBER WITH HIGH STRENGTH AND HIGH MODULUS AND ITS PREPARATION METHOD

CROSS-REFERENCE TO RELATED APPLICATIONS

This application is a continuation of International Patent Application No. PCT/CN2011/080401 filed on Sep. 30, 2011, which claims the priority benefit of China patent application No. 201110222300.0, filed on Aug. 4, 2011. All of these related applications are incorporated herein by reference in their entirety and made a part of this application.

FIELD OF THE INVENTION

The present invention pertains to the technical field of high-performance organic fiber and specifically relates to a high-strength high-modulus polyimide fiber and its preparation method.

BACKGROUND OF THE INVENTION

Polyimide (PI) fiber as one type of high-performance fiber has high strength, high modulus, resistance to high temperature, low temperature and radiation and other high performances in addition to good biocompatibility and dielectric properties. Extensive application is expected in the fields of atomic energy industry, space environment, wrecking, aerospace, national defense, new-type buildings, high-speed vehicles, oceanic development, sports equipment, new energy, environmental industry and protection equipment.

The current methods for preparing PI fiber mainly include one-step method and two-step method. The technical route of the one-step method: A PI solution is used as a spinning solution. PI fiber is spin by wet method or dry-wet method. After preliminary drawing, the fiber possesses certain strength. After the solvent is removed, thermal drawing and thermal treatment (300° C.-500° C.) is conducted. High-strength high-modulus PI fiber may be obtained. This method features a simple spinning process, but in view of the current synthesis of PI, the common solvents are phenols. Phenol solvents (such as: cresol and p-chlorophenol) not only have high toxicity but also have a large residual amount in fiber. They can hardly be thoroughly removed. It is not good for environmental protection, resulting in difficulty in industrialization. Moreover, the technology of one-step method has very high requirement on the solubility of PI. This greatly reduces the corrosion resistance and heat resistance of PI fiber. Chinese invention patent ZL 02112048.X and American patents U.S. Pat. No. 4,370,290 and U.S. Pat. No. 5,378,420 all disclose a method for preparing PI fiber by one-step method. The technical route of two-step method: Firstly, the concentrated solution of polyamic acid (PAA) is sprayed by wet method or dry-wet method to obtain PAA fiber. Then the PAA fiber obtained in the first step is chemically or thermally cyclized to obtain PI fiber. For example, Japanese published unexamined patent applications JP3287815 and JP4018115 both adopt this method to prepare PI fiber. The advantage of this method: It solves the processing difficulty caused by the infusibility and insolubility of PI fiber, the synthetic raw materials and solvents have many types and low toxicity. The residual amount of the solvents in the fiber is low. It is suitable for industrial production. The disadvantage of this method: The mechanical property of PI fiber prepared by this method is low in general.

Chinese patent (Application No.: 200710050651.1) discloses a PI fiber with a benzimidazole structure and its preparation method. In this method, PAA spinning solution is prepared from 2-(4-aminophenyl)-1H-benzimidazol-5-amine (BIA) and diandhydrides at a molar ratio of 1:1, then the PAA spinning solution is spun to obtain PAA precursor and in the end the PAA precursor is thermally imidized to obtain PI fiber. Its tensile strength is 0.73~1.53 GPa and initial modulus is 45.2~220 GPa. Chinese patent application (application No.: 201010572496.1) discloses a PI fiber made from 3,3',4,4'-biphenyl tetracarboxylic diandhydride (BPDA), p-phenylenediamine (pPDA) and 2-(4-aminophenyl)-1H-benzimidazol-5-amine (BIA) and its preparation method, specifically: p-PDA and BIA with a molar ratio of 0.8~0.95:0.05~0.2 and BPDA are dissolved in a solvent to obtain a PAA spinning solution. Then the PAA spinning solution is spun to obtain PAA fiber. Then the PAA fiber is dried, thermally cyclized and thermally drawn to obtain PI fiber. Its strength is 2.5 GPa. In the foregoing two methods, the mechanical property of PI fiber is improved both by adding BIA. Although the mechanical property is improved remarkably, it sill does not meet the performance requirements of high-strength high-modulus polyimide. Greater breakthrough and change in synthesis method and preparation process are needed.

SUMMARY OF THE INVENTION

The problem that the present invention needs to solve is to overcome the defects of the foregoing preparation methods, further improve the mechanical property of PI fiber and make it meet the performance requirements of high-strength high-modulus polyimide fiber.

The present invention provides a PI fiber obtained from random copolymerization of BPDA, pPDA and BIA. The molar ratio between pPDA and BIA is 1:10~3:1. The tensile strength of the obtained PI fiber is 3.0~4.5 GPa and initial modulus is 110~201 GPa.

The foregoing PI fiber also includes the copolymerization with other diamine or/and dianhydride monomers. The molar ratio between the addition amount of other diamines and the total addition amount of pPDA and BIA is 1:10~1:4. The molar ratio between other dianhydrides and biphenyl dianhydride is 1:10~3:7.

These diamines and diandhydrides are all kinds of diamine and diandhydride monomers used by those of ordinary skill in the art to synthesize PI. Below is the general formula:

Where, R and $R_1$ stand for conventional structural groups in diamines and diandhydride monomers in the art, such as: aromatic groups and heterocyclic structures.

The present invention also provides a method for preparing the foregoing PI fiber, which includes the following steps:

A: pPDA, BIA and BPDA are proportioned at a molar ratio of 1:0.95~1:1.05 between diamines and diandhydrides. The molar ratio between pPDA and BIA is 1:10~3:1.

B: A measured solvent is added to the diamines in Step A under the protection of $N_2$ to dissolve it. Then diandhydrides are added to make the solid content of the solution be 5~35 wt %. After sufficient reaction, a PAA spinning solution is obtained.

C: The PAA spinning solution is spin by wet or dry-wet spinning process. One-step continuous preparation method is adopted, i.e.: after a spinning solution is sprayed out from a spinneret plate, it continuously undergoes solidification in a coagulating bath, water scrubbing bath, treatment in heat furnaces at different temperature and fiber collection to obtain high-strength high-modulus polyimide fiber.

In the foregoing method, other diamines are also added in Step A. The molar ratio between the addition amount of other diamines and the total addition amount of pPDA and BIA is 1:10~1:4. Other diandhydrides are also added in Step A. The molar ratio between other diandhydrides and BPDA is 1:10~3:7.

In this method, the solvent used in Step B is dimethylformamide (DMF), dimethylacetamide (DMAc) or N-methyl pyrrolidone (NMP). The synthesis of a PAA solution adopts gradient temperature reaction. There are 2~5 temperature sections. The temperature in each section is 75° C.~−10° C. The reaction time varies with temperature sections. The total reaction time is 2~20 h. The preferred gradient temperature is of successive decrease.

In the foregoing method, the bore diameter of the spinneret plate used in Step C is 00.045 mm-0.75 mm, the number of bores is 50~2000, the coagulating bath and washing bath when wet or dry-wet process is adopted are one of water, methanol, ethanol, glycol, acetone, toluene, N,N-DMF (DMF), N,N-DMAc, NMP and dimethyl sulfoxide (DMSO) or a mixture of a few of them. There are at least four stages of heat furnaces in the one-step continuous preparation method, the temperature of each heat furnace is 80° C.-550° C., the draw ratio is 1~2, the total furnace passing time is 5~30 min, and the gas in the furnaces is air or nitrogen. Drawing at a ratio of 3~7 is conducted when the temperature is above 400° C., and the gas in the furnaces is nitrogen. Preferably, the temperature of the four-stage furnaces is successively increased.

Compared with the prior art, the present invention has the following innovations and desirable effects:

1. The present invention adopts BPDA, pPDA, BIA and other diamines and diandhydrides to synthesize and prepare multi-component copolymer system PI fiber. By proceeding from the structure-performance relationship of PI fiber and through changing the molecular structure of PAA and increasing intermolecular and intramolecular forces, the optimal proportioning range of monomers is determined. The PI fiber prepared in this range has a more reasonable molecular structure and intermolecular force, thereby greatly improving the performance of PI fiber.
2. The present invention adopts a reaction method of nitrogen protection and gradient temperature, overcomes the difficulty that the reaction activity decreases with the increase of BIA content which leads to the small molecular weight and the uneasy spinning property of the obtained PAA, guarantees the appropriate molecular weight and spinning property of PAA while BIA content is greatly increased. The strength of the PI fiber may reach 4.5 GPa and its modulus may reach 201 GPa (the comparison with the PI fiber prepared by other techniques is shown in Table 1). The PI fiber has a fairly high performance/price ratio. With the popularization of raw materials and fall of price, the performance/price ratio of this fiber will be raised further.
3. The present invention adopts the one-step continuous preparation method. From PAA spinning solution, spinning, solidification, water scrubbing, thermal cyclization, thermal drawing to final fiber winding and collection, they are all within the one-step continuous process. Further, drawing the fiber to different extent in different stages facilitates the rearrangement and orientation of the molecular chains. The high degree of imidization and few defects ensure the problem of poor uniformity and stability of the fiber is solved while the fiber obtains high performance. This method significantly raises production efficiency, reduces production cost, enhances fiber performance and is very favorable to industrial production.

TABLE 1

Performance comparison between the PI fiber in the art and the PI fiber in other prior arts

| Type of PI fiber | Performance | |
|---|---|---|
| | Strength (GPa) | Modulus (GPa) |
| PI fiber in prior art 1 | 0.73-1.53 | 45.2-220 |
| PI fiber in prior art 2 | 2.5 | — |
| PI fiber in the art | 3.0-4.5 | 110-201 |

The PI fiber in prior art 1 is the fiber obtained from Chinese patent (application No.: 200710050651.1). The PI fiber in prior art 2 is the fiber obtained from Chinese patent (application No.: 201010572496.1).

DETAILED DESCRIPTION OF THE EMBODIMENTS

It should be noted that the following embodiments are intended to illustrate the present invention and not to limit the technical solutions described by the present invention. Therefore, although this Description describes the present invention in details in connection with the following embodiments, those of ordinary skill in the art should understand that modifications or equivalent replacements may still be made to the present invention; and all technical solutions and their modifications not departing from the spirit and scope of the invention should be within the scope of claims of the present invention.

Further, it should be noted that the structures of BPDA, p-PDA and BIA used in the following embodiment are shown below:

3, 3',4,4',-Biphenyl tetracarboxylic diandhydride (BPDA)

p-phenylenediamine (p-PDA)

2-(4-aminophenyl)-1H-benzimidazol-5-amine (BIA)

4,4'-diaminodiphenyl ether (ODA)

m-phenylenediamine
(mPDA)

Pyromellitic dianhydride
(PMDA)

Oxydiphthalic andhydride (ODPA)

3, 3',4,4',-benzophenone tetracarboxylic
dianhydride (BTDA)

Embodiment 1

Synthesis of a PAA solution: At a molar ratio BPDA: pPDA:BIA=4.2:3:1, two diamine monomers P-PDA and BIA are put in a three-necked flask at first, then measured solvent DMF is added, P-PDA and BIA are stirred at 50° C. under the protection of nitrogen and are fully dissolved, then BPDA is added in batches and stirred to ensure its solid content is 10%. Then under the protection of nitrogen, it is stirred 2 h at 50° C., 1 h at 10° C. and 2 h at −5° C. to obtain a viscous PAA solution with intrinsic viscosity of 3.0 dl/g.

Preparation of PI fiber: After the PAA solution is filtered and defoamed, it is spun by a dry-wet process. After the spinning solution is pumped out by a metering pump, it passes the spinneret plate (number of bores: 100; bore diameter: 0.15 mm), goes through an air layer (length: 50 mm) and then enters a coagulating bath (it comprises water and ethanol, with a volume ratio of 1:1) to form PAA fiber. After it is washed in a washing bath (comprising water), it directly enters the four-stage heat furnaces in turn. The temperature of the heat furnaces is 200° C., 260° C., 300° C. and 400° C. respectively and the draw ratio is 1.5, 1.2, 1.1 and 3.5 respectively. In the end, the yarn is wound into a roll to obtain PI fiber.

Figure 1:
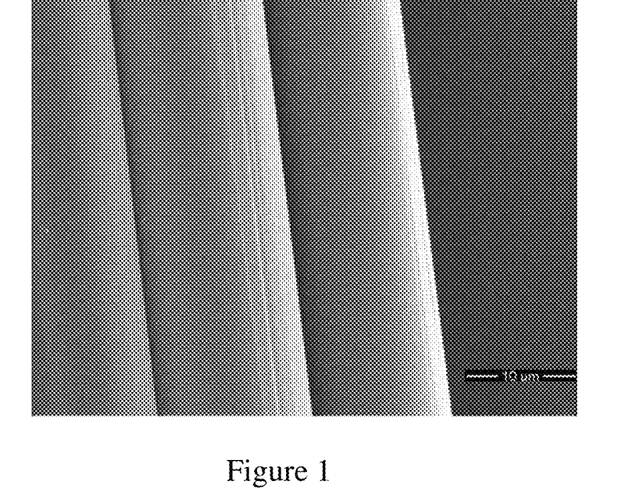
FIG. 1 is a surface morphology of the PI fiber in Embodiment 1 of the present invention by scanning electron microscopy (SEM).

The structure of the obtained fiber is as follows:

Where, m:n=1:3, its tensile strength is 3.4 GPa and initial modulus is 153.5 GPa. FIG. 1 indicates that there is a regular groove structure on the surface of the PI fiber prepared by this method, and the fiber may generate stronger conjugation with resin matrix and widely applied in the field of compound materials.

Embodiment 2

Synthesis of a PAA solution: At a molar ratio BPDA: pPDA:BIA=21:13:7, two diamine monomers P-PDA and BIA are put in a three-necked flask at first, then measured solvent DMAc is added, P-PDA and BIA are stirred at 70° C. under the protection of nitrogen and are fully dissolved, then BPDA is added in batches and stirred to ensure its solid content is 15%. Then under the protection of nitrogen, it is stirred 5 h at 70° C., 2 h at 20° C. and 3 h at 0° C. to obtain a viscous PAA solution with intrinsic viscosity of 2.5 dl/g.

Preparation of PI fiber: After the PAA solution is filtered and defoamed, it is spun by a wet process. After the spinning solution is pumped out by a metering pump, it passes the spinneret plate (number of bores: 50; bore diameter: 0.075 mm) and enters a coagulating bath (it comprises water) to form PAA fiber. After it is washed in a washing bath (comprising water), it directly enters the four-stage heat furnaces in turn. The temperature of the heat furnaces is 200° C., 280° C., 350° C. and 450° C. respectively and the draw ratio is 1.5, 1.3, 1.2 and 3.5 respectively. In the end, the yarn is wound into a roll to obtain PI fiber.

Figure 2:
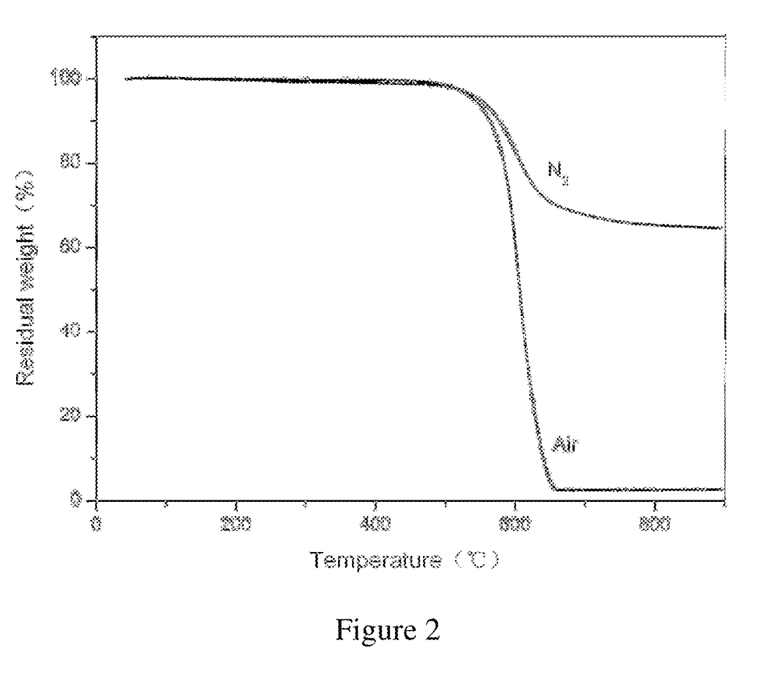
FIG. 2 is a thermogravimetric analysis (TGA) chart of the PI fiber in Embodiment 2 of the present invention.
Figure 3:
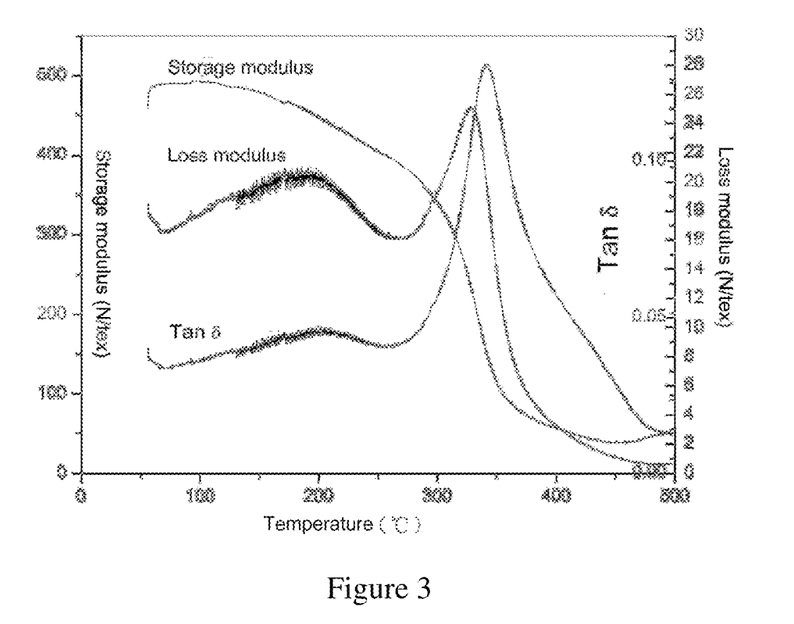
FIG. 3 is a dynamic thermomechanical analysis (DMA) chart of the PI fiber in Embodiment 2 of the present invention.

The structure of the obtained fiber is as follows:

Where, m:n=7:13, its tensile strength is 4.5 GPa and initial modulus is 201.3 GPa. FIG. 1 indicates that there is a regular groove structure on the surface of the PI fiber prepared by this method, and the fiber may generate stronger conjugation with resin matrix and widely applied in the field of compound materials. FIG. 2 and FIG. 3 indicate that the glass-transition temperature (Tg) of the PI fiber prepared in this embodiment reaches 341.7° C. and the thermal weight loss temperature when mass loss is 10% is 573.1° C. in nitrogen and 564.1° C. in air, suggesting the PI fiber in the art has superior thermal performance in addition to high strength and high modulus.

Embodiment 3

Synthesis of a PAA solution: At a molar ratio BPDA:pPDA:BIA=4.75:2:3, two diamine monomers P-PDA and BIA are put in a three-necked flask at first, then measured solvent DMAc is added, P-PDA and BIA are stirred at 75° C. under the protection of nitrogen and are fully dissolved, then BPDA is added in batches and stirred to ensure its solid content is 20%. Then under the protection of nitrogen, it is stirred 2 h at 75° C., 3 h at 30° C. and 10 h at 0° C. to obtain a viscous PAA solution with intrinsic viscosity of 2.3 dl/g.

Preparation of PI fiber: After the PAA solution is filtered and defoamed, it is spun by a wet process. After the spinning solution is pumped out by a metering pump, it passes the spinneret plate (number of bores: 500; bore diameter: 0.045 mm) and enters a coagulating bath (it comprises water and DMAc, with a volume ratio of 7:3) to form PAA fiber. After it is washed in a washing bath (comprising water and ethanol, with a volume ratio of 1:1), it directly enters the four-stage heat furnaces in turn. The temperature of the heat furnaces is 180° C., 280° C., 300° C. and 400° C. respectively and the draw ratio is 1, 1, 1 and 5 respectively. In the end, the yarn is wound into a roll to obtain PI fiber.

The structure of the obtained fiber is as follows:

Where, m:n=3:2, its tensile strength is 3.1 GPa and initial modulus is 165.2 GPa.

Embodiment 4

Synthesis of a PAA solution: At a molar ratio BPDA:ODA:pPDA:BIA=6:1:3:2, three diamine monomers ODA, p-PDA and BIA are put in a three-necked flask at first, then measured solvent DMAc is added, ODA, p-PDA and BIA are mechanically stirred at 50° C. under the protection of nitrogen and are fully dissolved, then BPDA is added in batches and stirred to ensure its solid content is 25%. Then under the protection of nitrogen, it is stirred 10 h at 50° C. and 5 h at −10° C. to obtain a viscous PAA solution with intrinsic viscosity of 3.1 dl/g.

Preparation of PI fiber: After the PAA solution is filtered and defoamed, it is spun by a wet process. After the spinning solution is pumped out by a metering pump, it passes the spinneret plate (number of bores: 500; bore diameter: 0.55 mm) and enters a coagulating bath (it comprises water and DMAc, with a volume ratio of 1:1) to form PAA fiber. After it is washed in a washing bath (comprising water and ethanol, with a volume ratio of 3:1), it directly enters the four-stage heat furnaces in turn. The temperature of the heat furnaces is 160° C., 270° C., 350° C. and 500° C. respectively and the draw ratio is 2, 1.5, 1.1 and 5.5 respectively. In the end, the yarn is wound into a roll to obtain PI fiber.

The structure of the obtained fiber is as follows:

Where, m:n:s=2:3:1, its tensile strength is 3.7 GPa and initial modulus is 146.2 GPa.

Embodiment 5

Synthesis of a PAA solution: At a molar ratio BPDA:m-PDA:p-PDA:BIA=14.7:2:5:7, three diamine monomers p-PDA, m-PDA and BIA are put in a three-necked flask at first, then measured solvent NMP is added, PPDA, MPDA and BIA are stirred at 75° C. under the protection of nitrogen and are fully dissolved, then BPDA is added in batches and stirred to ensure its solid content is 20%. Then under the protection of nitrogen, it is stirred 8 h at 75° C., 3 h at 15° C. and 9 h at −10° C. to obtain a viscous PAA solution with intrinsic viscosity of 2.8 dl/g.

Preparation of PI fiber: After the PAA solution is filtered and defoamed, it is spun by a wet process. After the spinning solution is pumped out by a metering pump, it passes the spinneret plate (number of bores: 1000; bore diameter: 0.065 mm) and enters a coagulating bath (it comprises water and NMP, with a volume ratio of 3:1) to form PAA fiber. After it is washed in a washing bath (comprising water), it directly enters the four-stage heat furnaces in turn. The temperature of the heat furnaces is 180° C., 240° C., 300° C. and 550° C. respectively and the draw ratio is 1.8, 1.5, 1.3 and 6 respectively. In the end, the yarn is wound into a roll to obtain PI fiber.

The structure of the obtained fiber is as follows:

Where, m:n:s=7:5:2, its tensile strength is 3.6 GPa and initial modulus is 178.1 GPa.

Embodiment 6

Synthesis of a PAA solution: At a molar ratio BPDA:PMDA:p-PDA:BIA=7.4:1:1:7, two diamine monomers p-PDA and BIA are put in a three-necked flask at first, then measured solvent DMF is added, p-PDA and BIA are stirred at 40° C. under the protection of nitrogen and are fully dissolved, then BPDA and PMDA are added in batches and stirred to ensure their solid content is 15%. Then under the protection of nitrogen, it is stirred 8 h at 40° C. and 4 h at 0° C. to obtain a viscous PAA solution with intrinsic viscosity of 2.60 dl/g.

Preparation of PI fiber: After the PAA solution is filtered and defoamed, it is spun by a wet process. After the spinning solution is pumped out by a metering pump. It passes the spinneret plate (number of bores: 2000; bore diameter: 0.055 mm) and enters a coagulating bath (it comprises water and DMF, with a volume ratio of 5:3) to form PAA fiber. After it is washed in a washing bath (comprising water and ethanol, with a volume ratio of 2:1), it directly enters the four-stage heat furnaces in turn. The temperature of the heat furnaces is 180° C., 260° C., 300° C. and 500° C. respectively and the draw ratio is 1.5, 1.3, 1.1 and 5 respectively. In the end, the yarn is wound into a roll to obtain PI fiber.

The structure of the obtained fiber is as follows:

Its tensile strength is 3.3 GPa and initial modulus is 126.4 GPa.

Embodiment 7

Synthesis of a PAA solution: At a molar ratio BPDA:ODPA:p-PDA:BIA=6:2.4:6:2, two diamine monomers p-PDA and BIA are put in a three-necked flask at first, then measured solvent DMAc is added, p-PDA and BIA are stirred at 25° C. under the protection of nitrogen and are evenly dispersed, then BPDA and ODPA are added in batches and stirred to ensure their solid content is 5%. Then under the protection of nitrogen, it is stirred 5 h at 25° C., 5 h at −10° C., 2 h at 10° C. and 2 h at 0° C. to obtain a viscous PAA solution with intrinsic viscosity of 2.78 dl/g.

Preparation of PI fiber: After the PAA solution is filtered and defoamed, it is spun by a dry-wet process. After the spinning solution is pumped out by a metering pump, it passes the spinneret plate (number of bores: 1000; bore diameter: 0.1 mm), goes through an air layer (length: 30 mm) and then enters a coagulating bath (it comprises water and methanol, with a volume ratio of 1:1) to form PAA fiber. After it is washed in a washing bath (comprising water and ethanol, with a volume ratio of 2:1), it directly enters the four-stage heat furnaces in turn. The temperature of the heat furnaces is 180° C., 280° C., 350° C. and 480° C. respectively and the draw ratio is 1.4, 1.2, 1 and 5 respectively. In the end, the yarn is wound into a roll to obtain PI fiber.

The structure of the obtained fiber is as follows:

Its tensile strength is 3.5 GPa and initial modulus is 141.7 GPa.

Embodiment 8

Synthesis of a PAA solution: At a molar ratio BPDA:BTDA:p-PDA:BIA=8.55:3:2:9, two diamine monomers p-PDA and BIA are put in a three-necked flask at first, then measured solvent DMF is added, p-PDA and BIA are stirred at 50° C. under the protection of nitrogen and are fully dissolved, then BPDA and BTDA are added in batches and stirred to ensure their solid content is 10%. Then under the protection of nitrogen, it is stirred 3 h at 50° C., 3 h at 10° C. and 5 h at 0° C. to obtain a viscous PAA solution with intrinsic viscosity of 2.56 dl/g.

Preparation of PI fiber: After the PAA solution is filtered and defoamed, it is spun by a wet process. After the spinning solution is pumped out by a metering pump, it passes the spinneret plate (number of bores: 2000; bore diameter: 0.045 mm) and enters a coagulating bath (it comprises water and DMF, with a volume ratio of 5:3) to form PAA fiber. After it is washed in a washing bath (comprising water and ethanol, with a volume ratio of 2:1), it directly enters the four-stage heat furnaces in turn. The temperature of the heat furnaces is 180° C., 280° C., 350° C. and 510° C. respectively and the draw ratio is 1.9, 1.3, 1.1 and 5.5 respectively. In the end, the yarn is wound into a roll to obtain PI fiber.

The structure of the obtained fiber is as follows:

Its tensile strength is 3.6 GPa and initial modulus is 152.1 GPa.

What is claimed is:

1. A high-strength high-modulus polyimide fiber obtained from random copolymerization of 3,3',4,4'-biphenyl tetracarboxylic dianhydride (BPDA), p-phenylenediamine (pPDA) and 2-(4-aminophenyl)-1H-benzimidazol-5-amine (BIA), wherein a molar ratio between pPDA and BPDA is 1:0.95~1:1.05 and a molar ratio between pPDA and BIA is 1:10~3:1;

wherein the high-strength high-modulus polyimide fiber is prepared by:

dissolving the pPDA and the BIA in a solvent, then adding the BPDA to obtain a solution with solid content of 5~35 wt %, after reaction of the obtained solution under 2-5 gradient temperature sections with a temperature in each section being from 75° C. to −10° C. and with a total reaction time of 2-20 h, a polyamic acid (PAA) spinning solution is obtained;

spinning the PAA spinning solution in a process, in which: after the PAA spinning solution is sprayed out from a spinneret plate, the PAA spinning solution continuously undergoes solidification in a coagulating bath to form PAA fiber, scrubbing the PAA fiber in a washing bath, treating the PAA fiber in at least four heat furnaces at different temperatures to obtain the high-strength high-modulus polyimide fiber;

wherein treating the PAA fiber in at least four heat furnaces at different temperatures includes:

drawing the PAA fiber in a first heat furnace at a temperature of 160-200° C. and a draw ratio of 1-2, drawing the PAA fiber obtained from the first heat furnace in a second heat furnace at a temperature of 240-280° C. and a draw ratio of 1-1.5, drawing the PAA fiber obtained from the second heat furnace in a third heat furnace at a temperature of 300-350° C. and a draw ratio of 1-1.3, drawing the PAA fiber obtained from the third heat furnace in a fourth heat furnace at a temperature of 400-550° C. and a draw ratio of 3-7, wherein the draw ratio in the first heat furnace is equal to or larger than the draw ratio in the second heat furnace, and the draw ratio in the second heat furnace is equal to or larger than the draw ratio in the third heat furnace.

2. The high-strength high-modulus polyimide fiber according to claim 1, wherein the high-strength high-modulus polyimide fiber is obtained:

from random copolymerization of BPDA, pPDA and BIA with other diamine, wherein molar ratio between said other diamine and the total amount of pPDA and BIA is 1:10~1:4, or from random copolymerization of BPDA, pPDA and BIA with other dianhydride, wherein molar ratio between said other dianhydride and BPDA is 1:10~3:7, or from random copolymerization of BPDA, pPDA and BIA with other diamine and other dianhydride, wherein molar ratio between said other diamine and the total amount of pPDA and BIA is 1:10~1:4, and molar ratio between said other dianhydride and BPDA is 1:10~3:7.

3. The high-strength high-modulus polyimide fiber according to claim 1, wherein the high-strength high-modulus polyimide fiber has a tensile strength of 3.0-4.5 GPa and initial modulus of 110-201 GPa.

4. The high-strength high-modulus polyimide fiber according to claim 2, wherein said other diamine is selected from m-phenylenediamine (mPDA) and 4,4'-diaminodiphenyl ether (ODA).

5. The high-strength high-modulus polyimide fiber according to claim 2, wherein said other dianhydride is selected from pyromellitic dianhydride (PMDA), Oxydiphthalic andhydride (ODPA), and 3,3',4,4'-benzophenone tetracarboxylic dianhydride (BTDA).

* * * * *